(12) United States Patent
Renner et al.

(10) Patent No.: US 7,785,410 B2
(45) Date of Patent: Aug. 31, 2010

(54) INK JET INK COMPOSITION AND METHOD FOR PRINTING ON SUBSTRATES UNDER CONDITIONS OF HIGH STATIC ELECTRICAL CHARGE

(75) Inventors: Terrence A. Renner, Naperville, IL (US); Patrick J. Moss, Wheaton, IL (US); Ayesha Syed, Glendale Heghs, IL (US); Sumana Sharmin, Schaumburg, IL (US); Linfang Zhu, Naperville, IL (US); Matthew B. Tomlin, Stapleford (GB)

(73) Assignee: Videojet Technologies Inc.

( * ) Notice: Subject to any disclaimer, the term of this patent is extended or adjusted under 35 U.S.C. 154(b) by 369 days.

(21) Appl. No.: 11/479,881

(22) Filed: Jun. 30, 2006

(65) Prior Publication Data

US 2008/0000387 A1   Jan. 3, 2008

(51) Int. Cl.
*C09D 11/02* (2006.01)
(52) U.S. Cl. .............. 106/31.27; 106/31.58; 106/31.37; 106/31.43
(58) Field of Classification Search .............. 106/31.27, 106/31.58, 31.37, 31.43
See application file for complete search history.

(56) References Cited

U.S. PATENT DOCUMENTS

| | | |
|---|---|---|
| 4,024,096 A | 5/1977 | Wachtel |
| 4,070,322 A | 1/1978 | Hwang |
| 4,243,694 A | 1/1981 | Mansukhani |
| 5,443,628 A | 8/1995 | Loria et al. |
| 5,594,044 A * | 1/1997 | Yang ........................... 523/160 |
| 5,674,923 A | 10/1997 | Subbaraman |
| 5,693,127 A | 12/1997 | Nigam et al. |
| 5,800,601 A | 9/1998 | Zou et al. |
| 5,889,083 A | 3/1999 | Zhu |
| 6,010,564 A | 1/2000 | Zhu et al. |
| 6,117,225 A | 9/2000 | Nicolls |
| 6,133,342 A | 10/2000 | Mizobuchi et al. |
| 6,140,391 A | 10/2000 | Zou et al. |

(Continued)

FOREIGN PATENT DOCUMENTS

JP          57-195775 A         12/1982

(Continued)

OTHER PUBLICATIONS

Anna. "Elasto-Capillary Thinning and Breakup of Model Elastic Liquids," *Journal of Rheology*, 45(1): 115-138 (Jan./Feb. 2001).

(Continued)

*Primary Examiner*—Jerry Lorengo
*Assistant Examiner*—Veronica Faison Gee
(74) *Attorney, Agent, or Firm*—Joseph A. Yosick

(57) ABSTRACT

Disclosed is an ink jet ink composition suitable for printing on substrates holding high static electrical charges such as polyethylene and PVC films and tubes. The ink jet ink composition comprises an organic solvent having a boiling point greater than 56° C., a binder resin soluble in the organic solvent, a colorant soluble in the organic solvent, and a polyvinylbutyral resin. Also disclosed is a method of printing images on such plastic substrates and a method for reducing microsatellite formation during ink jet printing. The ink jet ink composition provides improved print quality and reduced need for cleaning the nozzle.

21 Claims, 3 Drawing Sheets

8000
300 PRINTS
PVC FILM

U.S. PATENT DOCUMENTS

| | | |
|---|---|---|
| 6,210,472 B1 | 4/2001 | Kwan et al. |
| 6,221,933 B1 | 4/2001 | Zhu et al. |
| 6,235,829 B1 | 5/2001 | Kwan |
| 6,251,175 B1 | 6/2001 | Zhu et al. |
| 6,261,348 B1 | 7/2001 | Kwan et al. |
| 6,372,819 B1 | 4/2002 | Mizobuchi et al. |
| 6,444,019 B1 * | 9/2002 | Zou et al. .................. 106/31.4 |
| 6,478,861 B1 | 11/2002 | Kwan et al. |
| 6,645,280 B1 | 11/2003 | Zhu et al. |
| 6,726,756 B1 * | 4/2004 | Zou et al. ................ 106/31.57 |
| 6,747,072 B1 | 6/2004 | Siddiqui |
| 6,908,186 B2 | 6/2005 | Zheng et al. |
| 6,923,855 B2 | 8/2005 | Harada |
| 6,986,808 B2 | 1/2006 | Fu et al. |
| 7,025,816 B2 | 4/2006 | Suzuki et al. |
| 7,041,162 B2 | 5/2006 | Ishizuka et al. |
| 2004/0110868 A1 | 6/2004 | Zhu et al. |
| 2004/0154495 A1 | 8/2004 | Zhu et al. |
| 2004/0220298 A1 | 11/2004 | Kozee et al. |
| 2005/0043438 A1 | 2/2005 | Moore |
| 2005/0090579 A1 | 4/2005 | Zhu et al. |
| 2005/0092204 A1 | 5/2005 | Zhu et al. |
| 2005/0166793 A1 | 8/2005 | Looman et al. |
| 2005/0248645 A1 | 11/2005 | Jenkins et al. |
| 2006/0107868 A1 | 5/2006 | Potenza et al. |

FOREIGN PATENT DOCUMENTS

| | | |
|---|---|---|
| JP | 59-074173 A | 4/1984 |
| JP | 10-306221 A | 11/1988 |
| JP | 02-016171 A | 1/1990 |
| JP | 2003-192930 A | 7/2003 |

OTHER PUBLICATIONS

Bazilevsky et al., "Effects of Polymeric Additives on Vapor Bubble Dynamics in Thermal Ink Jet Printing," *IS&Ts NIP 14: 1998 International Conference on Digital Printing Technologies*, 15-18 (1998).

Evans et al., "Optimisation of Ink Jet Droplet Formation Through Polymer Selection," *IS&Ts NIP 15: 1999 International Conference on Digital Printing Technologies*, 78-81 (1999).

Meyer et al., "Effects of Polymeric Additives on Thermal Ink Jets," *IS&T's NIP 13: 1997 International Conference on Digital Printing Technologies*, 675-680 (1997).

Shield et al., "Drop Formation by DOD Ink-Jet Nozzles: A Comparison of Experiment and Numerical Simulation," *IBM Journal of Research and Development*, 31(1): 96-110 (Jan. 1987).

* cited by examiner 8000
300 PRINTS
PVC FILM 8000
300 PRINTS
PE FILM

B7-10818-B311
316 PRINTS
PVC FILM

B7-10818-3311
657 PRINTS
PVC FILM

B7-10834-B320
1000 PRINTS
PVC FILM

B7-10834-B320
300 PRINTS
PVC FILM

INK JET INK COMPOSITION AND METHOD FOR PRINTING ON SUBSTRATES UNDER CONDITIONS OF HIGH STATIC ELECTRICAL CHARGE

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream so that the droplets are caused to form the desired printed image on that surface.

In general, an ink jet ink composition should meet certain requirements to be useful in ink jet printing operations. These relate to viscosity and resistivity of the ink, the solubility and compatibility of the components, and/or the wettability of the substrate. Further, the ink should be quick drying and smear resistant, and be capable of passing through the ink jet nozzle (s) without clogging, and permit rapid cleanup of the machine components with minimum effort. The printed message or image should also resist abrasion.

When printing in the drop-on-demand mode employing certain ink jet ink compositions on substrates which retain high static electric charges, such as polyethylene and polyvinyl chloride shrink wrap packaging materials, the printer nozzle tends to clog up more frequently than normal. The ink builds up around the nozzle on the nozzle plate. This leads to poor quality images. The printer nozzle requires periodic cleaning, which leads to more frequent printer down time. The foregoing shows that there exists a need for an ink jet ink composition that can provide improved quality of images on such substrates. There is also a need to reduce the incidence of ink build up and printer nozzle clogging.

The invention provides such a composition. The advantages of the invention, as well as additional inventive features, will be apparent from the description of the invention provided herein.

BRIEF SUMMARY OF THE INVENTION

The invention provides an ink jet ink composition having reduced ink build up on the printer nozzle plate. The invention provides an ink jet ink composition comprising an organic solvent having a boiling point greater than 56° C., a binder resin soluble in the organic solvent, a colorant soluble in the organic solvent, and a polyvinylbutyral resin. The invention also provides a method of printing on statically charged substrates. The ink jet ink composition of the invention provides one or more advantages: reduced ink build up on the printer nozzle, reduced down time or cleaning time, and improved print quality.

BRIEF DESCRIPTION OF THE SEVERAL VIEWS OF THE DRAWING(S)

DETAILED DESCRIPTION OF THE INVENTION

Figure 1:
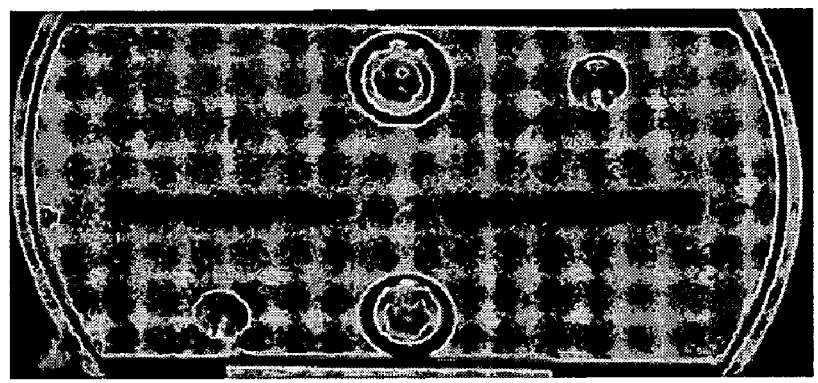
FIG. 1 depicts the ink build up obtained on the printer nozzle of an ink jet printer after 300 print cycles on a statically charged PVC film substrate employing a prior ink composition. For FIG. 1-4, see description in Example 1.

The present invention is predicated on the observation that substrates such as polyethylene and PVC films tend to hold high static electrical charge. This static charge is generated when the substrates unwind from the spool and/or are transported via a conveyor system under the printer nozzle. It is believed, without wishing to be bound by any theory or mechanism, that the static charge, which can be greater than 20 kV, tends to distort the ink droplets, for example, elongate the droplet tail, causing the droplet tail to more easily break up and form what are called "microsatellites", which is a collection of broken droplet tails, around the printer nozzle on the nozzle plate. These microsatellites accumulate on the printer nozzle, thereby reducing print quality and requiring frequent clean up to retain good print quality. Frequent cleaning results in reduced printing time. The present invention provides an ink jet ink composition that advantageously reduces microsatellite formation.

The present invention provides an ink jet ink composition comprising an organic solvent having a boiling point greater than 56° C., a binder resin soluble in the organic solvent, a colorant soluble in the organic solvent, and a polyvinylbutyral resin.

The binder resin should be soluble in the organic solvent. Any suitable organic solvent can be employed, specifically a ketone solvent, such as a lower alkyl ketone, particularly methyl ethyl ketone. The boiling point of the solvent is generally higher than 56° C., preferably from about 60 to about 150° C., and more preferably from about 75 to about 90° C. The organic solvent can be present in an amount from about 45% to about 85% by weight, preferably from about 50% to about 75% by weight, and more preferably from about 50% to about 66% by weight, of the ink jet ink composition. In an embodiment, the ink jet ink composition is free or substantially free of water. In an embodiment, the ink jet ink composition is free or substantially free of acetone.

Any suitable binder resin soluble in the organic solvent can be employed. Examples of binder resins include nitrocellulose resins, rosin resins, modified rosin resins, acrylic resins, styrene acrylic resins, and vinyl resins. The binder resin can be present in any suitable amount, for example, from about 10% to about 25% by weight, preferably from about 13% to about 22% by weight, and more preferably from about 18% to about 20% by weight, of the ink jet ink composition. An example of a rosin ester is STAYBELITE™ Ester 10, available from Hercules, Inc.; an example of a vinyl resin is VMCH™ resin, available from Union Carbide.

Any suitable colorant, e.g., a dye can be employed, particularly an azo dye, for example, anionic $Cr^{+3}$ complex dyes such Orasol Black RLI or Valifast Black 3808, available from CIBA Specialty Chemicals and Orient Corporation of America, respectively. The electrical conductivity of the colorant, e.g., the dye, should be advantageously high, for example, higher than about 400, for example, from about 700 to about 1500 Ohm-cm$^{-1}$. The colorant can be present in any suitable amount, for example, from about 2% to about 6% by weight, preferably from about 3% to about 5% by weight, and more preferably from about 3.3% to about 4% by weight, of the ink jet ink composition.

The polyvinylbutyral resin is believed to increase the viscosity of the ink jet ink composition, and reduce the length of the droplet tail during the flight of the droplet, and consequently reduce the formation of microsatellites. A high molecular weight resin polyvinylbutyral resin is preferred, for example, a weight average molecular weight of about 70,000 or greater, particularly about 250,000 or greater, e.g., about 250,000 to about 300,000. In an embodiment, the weight average molecular weight of the polyvinylbutyral resin can be up to 1 million. An example of a suitable polyvinylbutyral resin is PIOLOFORM™ BS18, available from Wacker-Chemie GmbH, which has a weight average molecular weight of 300,000.

The polyvinylbutyral resin can be present in the ink jet ink composition in any suitable amount, for example, less than about 0.5% by weight, particularly less than about 0.3% or 0.2% by weight, for example, from about 0.065% to about 0.15% by weight, preferably from about 0.10% to 0.13% by weight, of the ink jet ink composition. In an embodiment, the ink jet ink composition contains polyvinylbutyral resin in an amount of 0.125% by weight. The polyvinylbutyral resin advantageously provides a relatively large increase in the viscosity of the ink jet ink composition per unit weight of the added resin. For example, at 0.125% by weight, the polyvinylbutyral resin advantageously increases the viscosity of the ink jet ink composition by about 0.2 centipoise to about 1 centipoise at 25° C.

The ink jet ink composition of the invention can further include one or more additives, for example, co-solvents, plasticizers, wetting agents, and humectants. The co-solvents are typically high-boiling solvents, for example, those having a boiling point of 90° C. or greater or low relative evaporation rates. Any suitable co-solvent can be used, for example, alcohols, glycols, esters, ethers, ether alcohols, glycol ethers, pyrrolidones, and ester alcohols. Co-solvents improve the solubility of dyes. In an embodiment, the co-solvent is ethanol. The co-solvent can be present in an amount from about 3% to about 23% by weight, preferably from about 8% to about 15% by weight, and more preferably from about 11% to about 13% by weight, of the ink jet ink composition. The ink jet ink composition may also be free of co-solvents.

The plasticizer advantageously imparts flexibility and durability to the printed image. Any suitable plasticizer can be used, for example, an alkyl benzyl phthalate ester such as butyl benzyl phthalate, available as Plasticizer 8 from Rit-Chem Co. The plasticizer can be present in an amount from about 0% to about 2.5% by weight, preferably from about 0.5% to about 2% by weight, and more preferably from about 1.0% to about 1.5% by weight, of the ink jet ink composition.

The wetting agent advantageously imparts ink adhesion to the substrate. Any suitable wetting agent can be used, for example, a polyalkylene oxide- (e.g., polyethylene oxide-) modified polydimethylsiloxane, such as SILWET™ L-7622, available from OSi Specialties. The wetting agent can be present in an amount from about 0% to about 2% by weight, preferably from about 0.2% to about 1.5% by weight, and more preferably from about 0.5% to about 0.8% by weight, of the ink jet ink composition.

The humectant advantageously prevents ink drying out prematurely, for example, during printer idle times. Any suitable humectant can be used, for example, an alkyl acetate, such as n-propyl acetate, isopropyl acetate, or isoamyl acetate. The humectant advantageously keeps the ink drying time during printing on substrates low, which is desirably kept below 10 seconds, preferably below 2 seconds. The humectant can be present in an amount from about 0% to about 10% by weight, and more preferably from about 3% to about 8% by weight, of the ink jet ink composition.

In an embodiment, the present invention provides an ink jet ink composition wherein the organic solvent is a ketone solvent, the colorant is a dye, the binder resin is selected from the group consisting of nitrocellulose resin, rosin ester, vinyl resin, and any combination thereof, and the polyvinylbutyral resin has a weight average molecular weight ($M_W$) of about 70,000 or greater.

In accordance with any of the embodiments, the ketone solvent can be present in an amount from about 50% to about 85% by weight, the colorant can be present in an amount from about 3% by weight to about 5% by weight, the binder resin can be present in an amount from about 10% by weight to about 20% by weight, and the polyvinylbutyral resin can be present in an amount from about 0.05% to about 0.5% by weight of the ink jet ink composition.

In a specific embodiment, the ink jet ink composition comprises methyl ethyl ketone as the ketone solvent, Valifast Black 3808 as the dye, nitrocellulose resin as the binder resin, and a polyvinylbutyral resin having a molecular weight ($M_W$) of 250,000-350,000.

In any of the embodiments of the invention, the ink jet ink composition can further include ethanol as a co-solvent and isopropyl acetate, n-propyl acetate, or isoamyl acetate as humectants.

In any of the embodiments of the invention, the ink jet ink composition comprises methyl ethyl ketone as the ketone solvent, Orasol Black RLI as the dye, rosin ester and vinyl resin as binder resins, a silicone as the wetting agent, butyl benzyl phthalate as the plasticizer, and a polyvinylbutyral resin having a molecular weight ($M_W$) of 250,000-350,000.

The ink jet ink composition of the invention can be prepared by methods known to those skilled in the art, for example, by combining and mixing the desired ingredients, and optionally filtering the resulting composition.

The ink jet ink composition of the invention, when used in a drop-on-demand mode, has a viscosity of from about 2 centipoises to about 5 centipoises, preferably from about 2.7 centipoises to about 4 centipoises, at 25° C.

The present invention also provides a method for printing ink jet ink images on a substrate comprising ejecting from a plurality of orifices a series of droplets of any of the ink jet ink compositions described above to the substrate, controlling the timing of the emitted droplets with respect to the movement of the substrate so that the droplets form an image on the substrate, and allowing the images to dry. In accordance with the invention, the substrate is one which holds static electrical charges, for example, a plastic substrate holding high static electrical surface charge. An example of such plastic substrate is a packaging material, e.g., one that comprises polyvinyl chloride or polyethylene. PVC pipe is another substrate for printing.

The present invention further provides a method for reducing microsatellite formation on the printer nozzle plate during drop-on-demand ink jet printing of images on a substrate having high static electrical charge comprising directing a stream of droplets of any of the ink jet ink compositions described above onto the substrate and controlling the direction of the droplets so as to form an image on the substrate, whereby formation of microsatellite is reduced. The ink jet ink composition of the present invention provides uninterrupted printing up to 300 print cycles or more, preferably 600 print cycles or more, and more preferably up to 1000 print cycles or more. A print cycle indicates the time required to print one complete code on the substrate (e.g., one code per second). The ink jet ink composition is suitable for printing on all types of plastics that hold static electric charges, for example, shrink wrap materials, blow molder materials, corrugated paper, film such as biaxially oriented polypropylene, PVC, and frozen food and tobacco product wrappers.

The following examples further illustrate the invention but, of course, should not be construed as in any way limiting its scope.

EXAMPLE 1

This example demonstrates an ink jet ink composition in accordance with an embodiment of the invention. In Table 1 below, the base ink (1) is modified (1a) to contain the indicated percentage of polyvinylbutyral resin.

TABLE 1

Composition of an embodiment of the ink jet ink composition

| COMPONENT | Weight Percent - Base Ink (1) | Weight Percent - Modified Ink (1a) |
| --- | --- | --- |
| Methyl ethyl ketone | 66.1 | 66.0 |
| Isopropyl Acetate | 3.4 | 3.4 |
| SDA-3A Ethanol, 200 Proof | 3.0 | 3.0 |
| n-Propyl Acetate | 2.5 | 2.5 |
| Isoamyl Acetate | 2.5 | 2.5 |
| Nitrocellulose Resin | 19.2 | 19.2 |
| Valifast Black 3808 | 3.3 | 3.3 |
| PIOLOFORM BS18 | 0.0 | 0.125 |
| Total | 100.0 | 100.0 |

Figure 2:
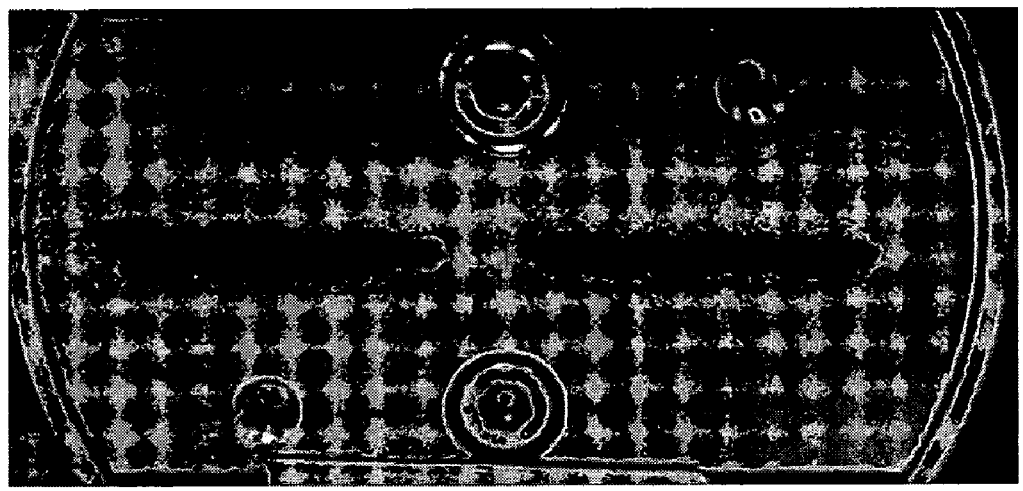
FIG. 2 depicts the ink build up obtained on a statically charged polyethylene (PE) film substrate using an ink jet ink composition of the invention.
Figure 3:
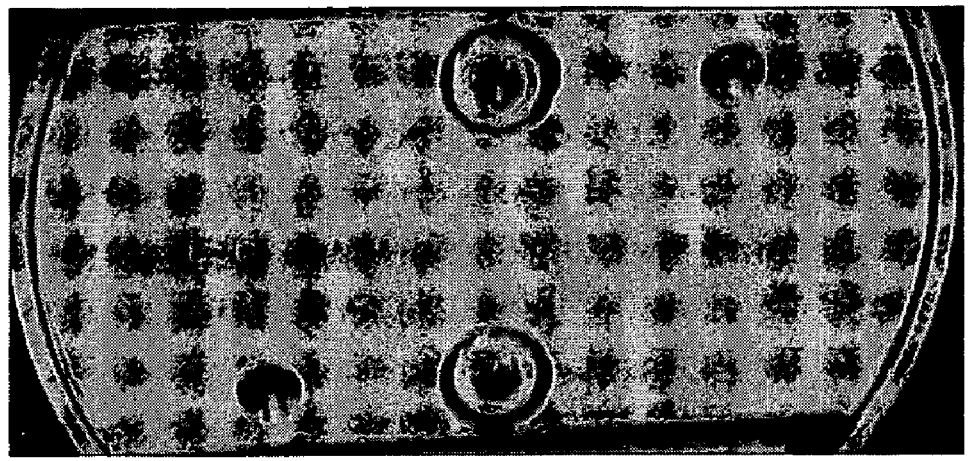
FIG. 3 depicts reduced ink build up obtained after 300+ print cycles on a statically charged PVC film substrate employing an ink jet ink composition of the invention.
Figure 4:
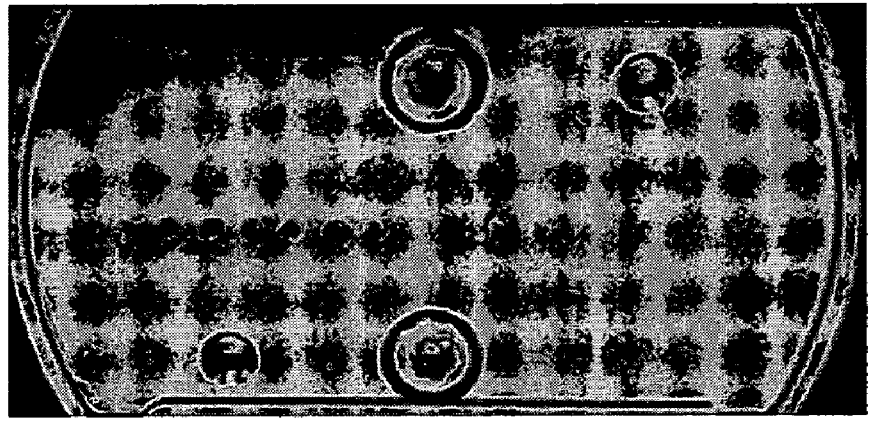
FIG. 4 depicts reduced ink build up obtained after 600+ print cycles on a statically charged PVC film substrate employing an ink jet ink composition of the invention.

Images or codes are printed employing the above ink jet ink compositions on PVC and polyethylene (PE) film substrates. FIG. 1 depicts the ink build up after 300 print cycles on the statically charged PVC substrate and FIG. 2 depicts the ink build up on the statically charged PE substrate, both printed using ink jet ink 1, showing extensive microsatellite formation and ink build up. FIG. 3 depicts reduced ink build up after 300+ print cycles on the statically charged PVC film substrate, relative to FIG. 1; and FIG. 4 depicts further reduced ink build up after 600+ print cycles on the statically charged PVC film substrate, relative to FIG. 3.

EXAMPLE 2

This example demonstrates another ink jet ink composition in accordance with an embodiment of the invention. In Table 2 below, the base ink (1) is modified (1a) to contain the indicated percentage of polyvinylbutyral resin.

TABLE 2

Composition of another embodiment of the ink jet ink composition

| COMPONENT | Weight Percent - Base Ink (2) | Weight Percent - Modified Ink (2a) |
| --- | --- | --- |
| Methyl ethyl ketone | 80.7 | 80.6 |
| STAYBELITE Ester 10 | 10.0 | 10.0 |
| VMCH | 3.3 | 3.3 |
| Plasticizer 160 | 1.0 | 1.0 |
| SILWET L-7622 | 0.5 | 0.5 |
| Orasol Black RLI | 4.5 | 4.5 |
| PIOLOFORM BS18 | 0.0 | 0.125 |
| Total | 100.0 | 100.0 |

Figure 5:
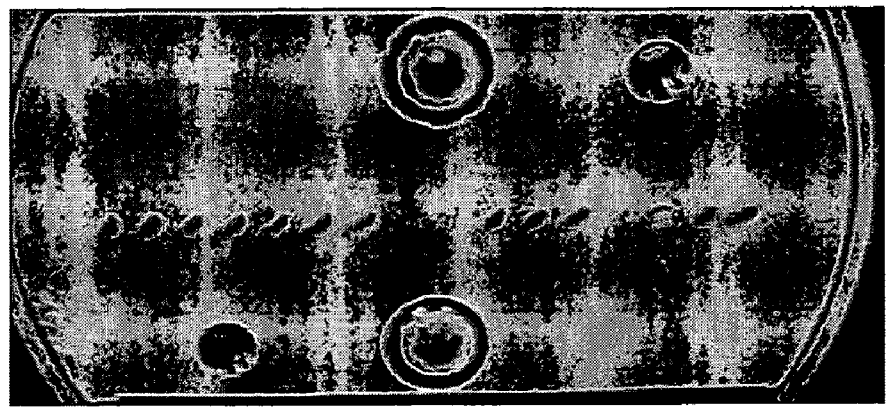
FIG. 5 depicts the ink build up obtained after 300 print cycles on a statically charged PVC film substrate, employing an ink jet ink composition of the invention. For FIG. 5-6, see description in Example 2.
Figure 6:
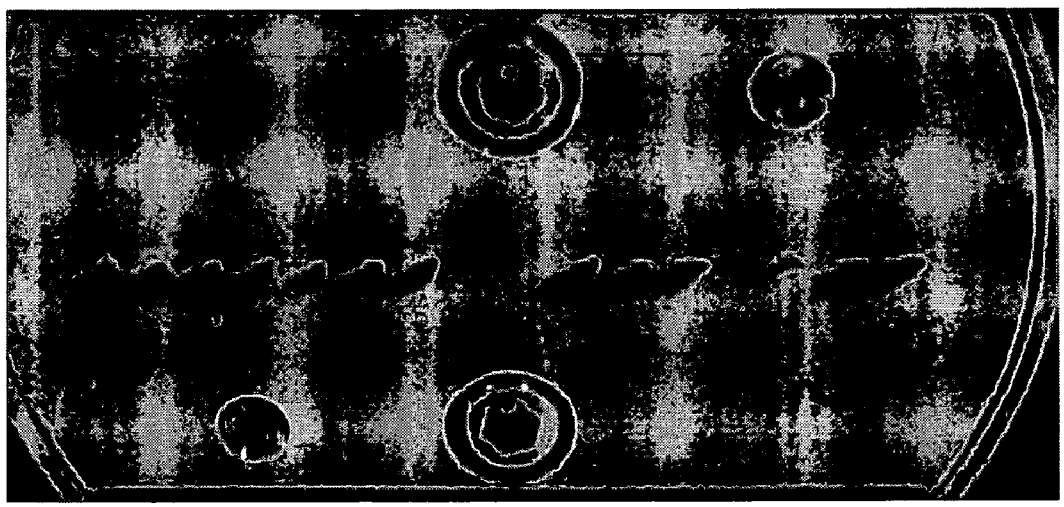
FIG. 6 depicts the ink build up obtained after 1000 print cycles on a statically charged PVC film substrate, employing an ink jet ink composition of the invention.

Images or codes are printed employing the above ink jet ink compositions on PVC substrates. FIG. 5 depicts the ink build up after 300 print cycles on a statically charged PVC film substrate and FIG. 6 depicts the ink build up on the statically charged film substrate, both printed using ink jet ink 2a. FIG. 5 shows that the ink jet ink composition has reduced ink build up after 300 print cycles relative to the base ink (ink build up not shown) and FIG. 6 depicts reduced ink build up after 1000 print cycles.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An ink jet ink composition comprising a ketone solvent, a binder resin soluble in the ketone solvent, a colorant soluble in the ketone solvent, and a polyvinylbutyral resin, wherein the binder resin is selected from the group consisting of nitrocellulose, rosin ester, vinyl resin, and any combination thereof, and wherein the polyvinylbutyral resin has a weight average molecular weight ($M_w$) of about 250,000 or greater.

2. The ink jet ink composition of claim 1, wherein the colorant is a dye.

3. The ink jet ink composition of claim 2, wherein the ketone solvent is methyl ethyl ketone.

4. The ink jet ink composition of claim 2, wherein the dye is an azo dye.

5. The ink jet ink composition of claim 4, wherein the azo dye is an anionic $Cr^{+3}$ dye.

6. The ink jet ink composition of claim 2, wherein the polyvinylbutyral resin is present in an amount less than about 0.5% by weight of the ink jet ink composition.

7. The ink jet ink composition of claim 2, further including one or more of co-solvents, plasticizers, wetting agents, and humectants.

8. The ink jet ink composition of claim 7, wherein the co-solvent is ethanol.

9. The ink jet ink composition of claim 7, wherein the plasticizer is an alkyl benzyl phthalate ester.

10. The ink jet ink composition of claim 7, wherein the wetting agent is a polyalkyleneoxide-modified polydimethylsiloxane.

11. The ink jet ink composition of claim 7, wherein the humectant is an alkyl acetate.

12. The ink jet ink composition of claim 11, wherein the alkyl acetate is n-propyl acetate, isopropyl acetate, or isoamyl acetate.

13. The ink jet ink composition of claim 2, wherein the ketone solvent is present in an amount from about 50% to about 85% by weight, the dye is present in an amount from about 3% by weight to about 5% by weight, the binder resin is present in an amount from about 10% by weight to about 20% by weight, and the polyvinylbutyral resin is present in an amount from about 0.05% to about 0.5% by weight of the ink jet ink composition.

14. The ink jet ink composition of claim 2, comprising methyl ethyl ketone as the ketone solvent, nitrocellulose resin as the binder resin, and a polyvinylbutyral resin having a molecular weight ($M_w$) of 250,000-350,000.

15. The ink jet ink composition of claim 14, which further includes ethanol as a co-solvent and isopropyl acetate, n-propyl acetate, or isoamyl acetate as humectants.

16. The ink jet ink composition of claim 2, comprising methyl ethyl ketone as the ketone solvent, a rosin ester resin and a vinyl resin as binder resins, a silicone as the wetting agent, butyl benzyl phthalate as the plasticizer, and a polyvinylbutyral resin having a molecular weight ($M_w$) of 250,000-350,000.

17. A method for printing ink jet ink images on a substrate comprising ejecting from a plurality of orifices a series of droplets of the ink jet ink composition of claim 1 to the substrate, controlling the timing of the emitted droplets with respect to the movement of the substrate so that the droplets form an image on the substrate, and allowing the images to dry.

18. The method of claim 17, wherein the substrate is a plastic substrate holding a static electrical surface charge of greater than 20 kV.

19. The method of claim 18, wherein the plastic substrate is a packaging material.

20. The method of claim 19, wherein the packaging material comprises polyvinyl chloride or polyethylene.

21. A method for reducing microsatellite formation on nozzle plate during drop-on-demand ink jet printing of images on a substrate having a static electrical charge of greater than 20 kV comprising directing a stream of droplets of the ink jet ink composition of claim 1 onto the substrate and controlling the direction of the droplets so as to form an image on the substrate, whereby formation of microsatellite is reduced.

* * * * *